(12) United States Patent
Choi et al.

(10) Patent No.: US 7,254,122 B2
(45) Date of Patent: Aug. 7, 2007

(54) APPARATUS AND METHOD FOR GENERATING PILOT BEACON SIGNAL IN BASE STATIONS OF CDMA SYSTEM

(75) Inventors: An Na Choi, Taejeon (KR); Jae Hwang Yu, Taejeon (KR); Jun Mo Koo, Taejeon (KR); Byung Moo Kim, Taejeon (KR)

(73) Assignee: SK Telecom Co., Ltd., Seoul (KR)

( * ) Notice: Subject to any disclaimer, the term of this patent is extended or adjusted under 35 U.S.C. 154(b) by 885 days.

(21) Appl. No.: 10/436,362

(22) Filed: May 13, 2003

(65) Prior Publication Data

US 2003/0214926 A1 Nov. 20, 2003

Related U.S. Application Data

(63) Continuation-in-part of application No. 09/362,068, filed on Jul. 28, 1999, now abandoned.

(51) Int. Cl.
*H04B 7/216* (2006.01)
(52) U.S. Cl. .................. 370/335; 370/331; 370/332; 370/334; 455/436; 455/437; 455/438
(58) Field of Classification Search ............. 370/335, 370/331, 332, 334; 455/436, 437, 438
See application file for complete search history.

(56) References Cited

U.S. PATENT DOCUMENTS

| 4,061,978 A | | 12/1977 | Motley et al. | |
|---|---|---|---|---|
| 4,584,540 A | | 4/1986 | DuBose et al. | |
| 5,619,526 A | * | 4/1997 | Kim et al. | 370/335 |
| 5,838,732 A | * | 11/1998 | Carney | 375/297 |
| 5,940,434 A | * | 8/1999 | Lee et al. | 375/146 |
| 5,974,041 A | | 10/1999 | Kornfeld et al. | |
| 6,035,197 A | * | 3/2000 | Haberman et al. | 455/439 |
| 6,091,765 A | | 7/2000 | Pietzold, III et al. | |
| 6,097,714 A | * | 8/2000 | Nagatani et al. | 370/342 |
| 6,172,994 B1 | * | 1/2001 | Schaffner et al. | 370/529 |
| 6,272,122 B1 | * | 8/2001 | Wee | 370/342 |

FOREIGN PATENT DOCUMENTS

| JP | 56-110321 | 9/1981 |
|---|---|---|
| JP | 1-157112 | 6/1989 |
| JP | 10-022785 | 1/1998 |

* cited by examiner

*Primary Examiner*—Steve M. D'Agosta

(57) ABSTRACT

An apparatus for generating pilot beacon signals for handoff between base stations having a different frequency assignment FA in a code division multiple access CDMA radio communication system includes a PN code generating unit for generating inphase (I)-channel and quadrature (Q)-channel pseudo noise (PN) sequences; a pulse shaping unit for shaping an I-channel and Q-channel PN signal by filtering the I-channel and Q-channel PN sequences; an equalizing unit for equalizing phases of the I-channel PN signal and the Q-channel PN signal and generating an equalized I-channel signal and an equalized Q-channel signal; an interpolation filtering unit for converting frequencies of the equalized I-channel signal with the equalized Q-channel signal to intermediate frequencies (IF) and generating an IF I-channel signal and an IF Q-channel signal; a modulation unit for modulating IF I-channel and Q-channel signals and generating a modulated I-channel signal and a modulated Q-channel signal; a combining unit for combining the modulated Q-channel signal and generating a digital pilot beacon signal; and a D/A conversion unit for converting the digital beacon signal into an analog pilot beacon signal.

9 Claims, 2 Drawing Sheets

APPARATUS AND METHOD FOR GENERATING PILOT BEACON SIGNAL IN BASE STATIONS OF CDMA SYSTEM

CROSS-REFERENCE TO RELATED APPLICATIONS AND CLAIM OF PRIORITY

The present application is a continuation-in-part of U.S. application Ser. No. 09/362,068, filed in the U.S. Patent and Trademark Office on Jul. 28, 1999, priority thereof being hereby claimed under 35 USC 120.

FIELD OF THE INVENTION

The present invention relates to an apparatus and method for generating a pilot beacon signal, particularly to an apparatus and method for generating a pilot beacon signal for handoff between base stations having a different frequency assignment (FA) in a code division multiple access (CDMA) radio communication system.

DESCRIPTION OF RELATED ART

FIG. 1 is a block diagram illustrating a conventional pilot signal generator for a base station in a CDMA communication system.

The pilot signal generator includes a digital channel signal processing unit 110, an analog signal processing unit 120, a sector connection processing unit 130, an up-converter 140 and an amplifier 150.

The digital channel signal processing unit 110 includes an in-phase (I)-channel pseudo noise (PN) code generator 111, a quadrature (Q)-channel PN code generator 115 and pulse shaping filters 113 and 117.

The I-channel PN code generator 111 generates and outputs the I-channel PN code sequences. The pulse shaping filter 113 shapes an I-channel PN signal by filtering the PN code sequence received from the I-channel PN code generator 111. The Q-channel PN code generator 115 generates and outputs Q-channel PN code sequences. The pulse shaping filter 117 shapes a Q-channel PN signal by filtering the Q-channel PN code sequence received from the Q-channel PN code-generator 115.

The analog signal processing unit 120 includes digital to analog (D/A) converters 121 and 125 and low pass filters 123 and 127.

The D/A converter 121 converts the I-channel PN code signal shaped in the pulse shaping filter 113 to an analog signal. An undesired component of the PN signal is generated during conversion to the analog signal. The low pass filter 123 removes this undesired component and extracts a desired band of the I-channel PN signal from the D/A converter 121. The Q-channel PN signal shaped in the pulse shaping filter 117 is converted into an analog signal and an undesired band of the Q-channel signal is filtered out in the D/A converter 125 and the low pass filter 127.

The sector connection processing unit 130 includes phase equalizers 131 and 134, low pass filters 132 and 135 and IF modulators 133 and 136, an analog combiner 137 and a band pass filter 138.

The phase equalizer 131 compensates a phase of the I-channel signal from the D/A converter 123. The low pass filter 132 removes an undesired component generated during equalization, extracts and provides the IF modulator 133 with a desired band of the equalized I-channel PN signal.

The IF modulator 133 modulates an intermediate frequency signal that has been converted from the low frequency signal to an intermediate frequency signal by an up-converter (not shown).

On the other hand, a Q-channel PN signal is converted to a Q-channel analog IF modulated signal in similar way with the I-channel PN signal through the Q-channel PN code generator 115, the pulse shaping filter 117, the D/A converter 125, the low pass filter 127, the phase equalizer 134, the low pass filter 135 and the IF modulator 136.

The analog combiner 137 combines the I-channel PN signal with the Q-channel PN signal from the IF modulators 133 and 136. The band pass filter 138 filters out an undesired band of the combined signal, converts the intermediate frequency of the filtered signal to a high frequency signal and generates a pilot signal. The amplifier 140 amplifies the pilot signal to be radiated through the antenna.

The conventional pilot signal generator as mentioned above uses more analog components than digital components. These analog components are complicated and large. Also, the analog components are sensitive to noise. Accordingly, when mounting analog components on a board, the integration density of these analog components is lower. The noise of the analog components prevents the communication system from being stabilized.

Further, in a conventional digital communication system, since the pilot signal is generated and transmitted along with the traffic signal through a modem for the CDMA base station, there is a problem in that the pilot signal affects other mobile stations as an interference signal.

SUMMARY OF THE INVENTION

Therefore, it is an object of the present invention to provide an apparatus and method for generating pilot beacon signals, which reduces noise of the pilot beacon signal and stabilizes the communication system.

It is further another object of the present invention to provide an apparatus for generating pilot signals, having a higher integration density.

It is still further another object of the present invention to provide an apparatus for generating pilot signals, which generates and transmits only a pilot signal so as to reduce interference with other mobile stations.

In accordance with an aspect of the present invention, an apparatus is provided for generating pilot beacon signals for handoff between base stations having a different frequency assignment (FA) in a code division multiple access (CDMA) radio communication system, the apparatus including: a PN code generating unit for generating inphase (I)-channel and quadrature (Q)-channel pseudo noise (PN) sequences; a pulse shaping unit for shaping an I-channel PN signal and a Q-channel PN signal by filtering the I-channel and Q-channel PN sequences; an equalizing unit for equalizing phases of the I-channel PN signal and the Q-channel PN signal and generating an equalized I-channel signal and an equalized Q-channel signal; an interpolation filtering unit for converting frequencies of the equalized I-channel signal with the equalized Q-channel signal to intermediate frequencies (IF) and generating an IF I-channel signal and an IF Q-channel signal; a modulation unit for modulating IF I-channel and Q-channel signals and generating a modulated I-channel signal and a modulated Q-channel signal; a combining unit for combining the modulated I-channel signal with the modulated Q-channel signal and generating a digital pilot beacon signal; and a D/A conversion unit for converting the digital pilot beacon signal into an analog pilot beacon signal.

In accordance with another aspect of the present invention, a method is provided for generating pilot beacon signals for handoff between base stations having a different frequency assignment (FA) in a code division multiple access (CDMA) radio communication system, the method including the steps of: a) generating inphase (I)-channel and quadrature (Q)-channel pseudo noise (PN) sequences with a PN code generating unit; b) shaping an I-channel PN signal and a Q-channel PN signal by filtering the I-channel and Q-channel PN sequences with a pulse shaping unit; c) equalizing phases of the I-channel PN signal and the Q-channel PN signal and generating an equalized I-channel signal and an equalized Q-channel signal with an equalizing unit; d) converting frequencies of the equalized I-channel signal with the equalized Q-channel signal to intermediate frequencies (IF) and generating an IF I-channel signal and an IF Q-channel signal with an interpolation filtering unit; e) modulating IF I-channel and Q-channel signals and generating a modulated I-channel signal and a modulated Q-channel signal with a modulation unit; f) combining the modulated I-channel signal with the modulated Q-channel signal and generating a digital pilot beacon signal with a combining unit; and g) converting the digital pilot beacon signal into an analog pilot beacon signal with a D/A conversion unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Hereinafter, an embodiment according to the present invention will be described in detail referring to FIG. 2.

Figure 1:
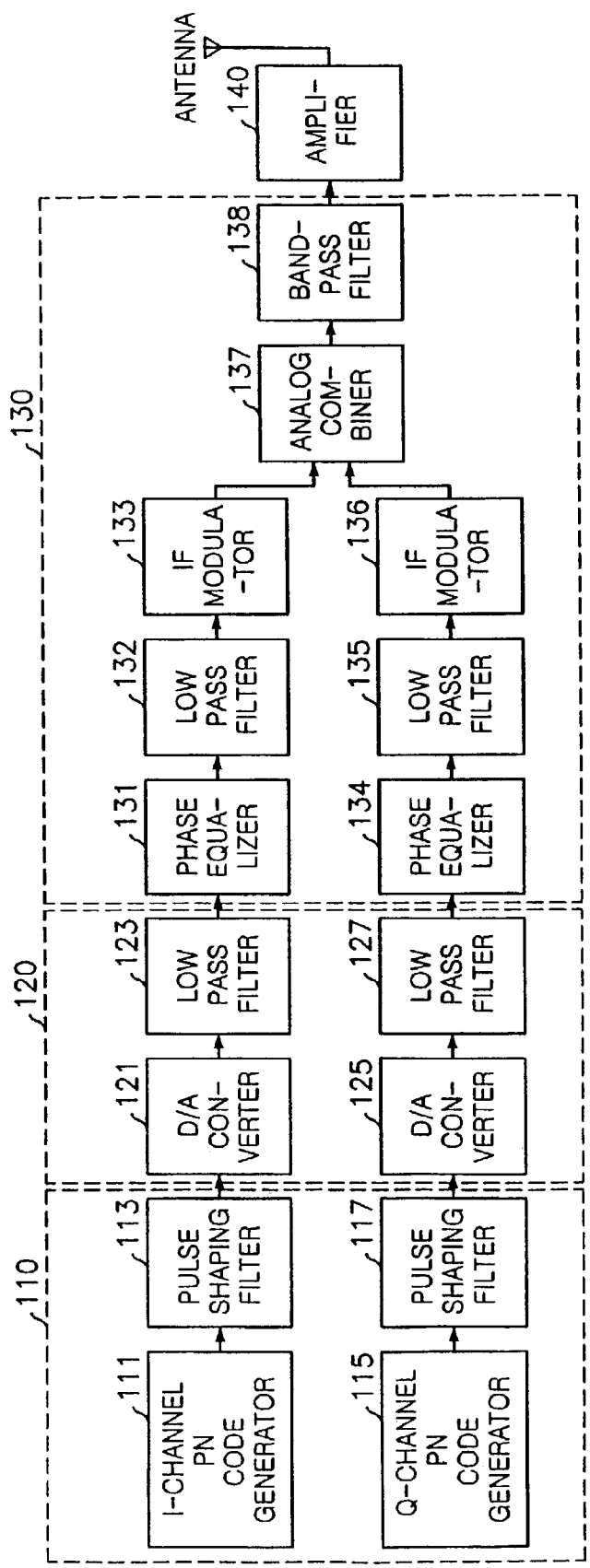
FIG. 1 is a block diagram illustrating a conventional pilot signal generator for a base station.
Figure 2:
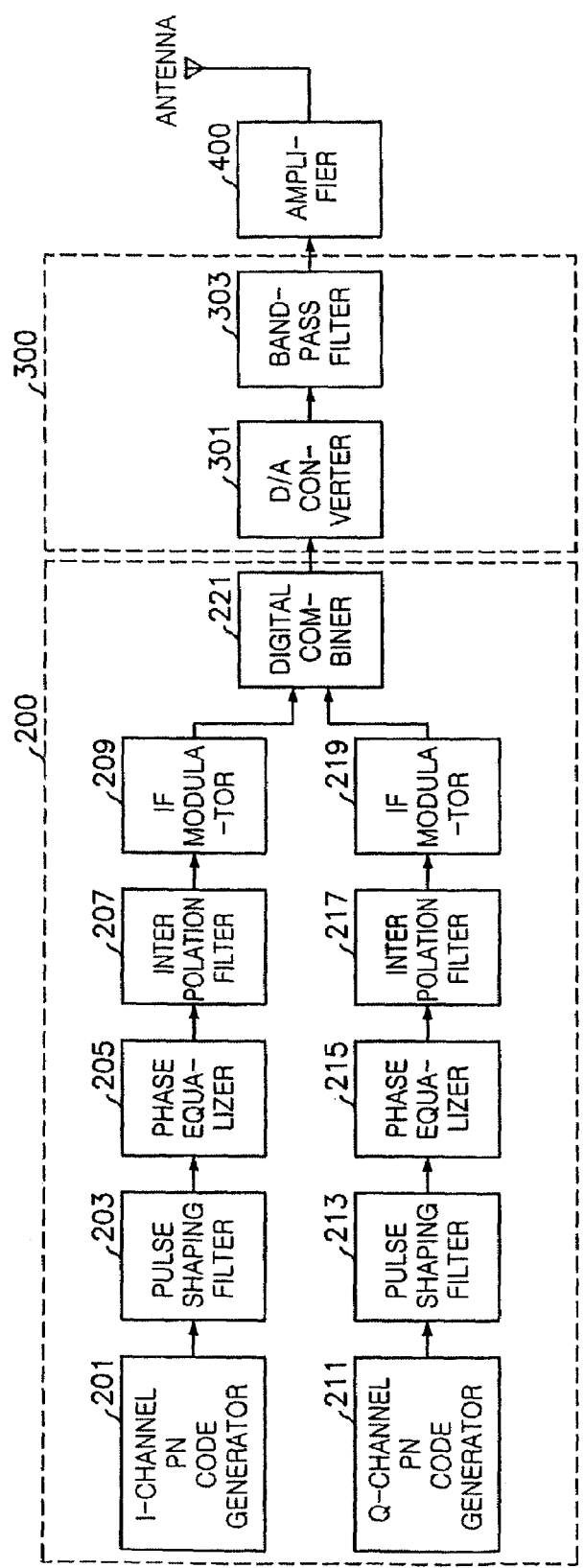
FIG. 2 is a block diagram illustrating a pilot beacon signal generator for a base station in accordance with the present invention.

FIG. 2 shows a block diagram illustrating a pilot beacon signal generator for a base station in accordance with an embodiment of the present invention.

The pilot beacon signal generator includes a digital pilot beacon signal generating unit 200, an analog signal processing unit 300 and an amplifier 400. The digital pilot beacon signal generating unit 200 includes an in-phase (I) PN code generator 201, a quadrature (Q) PN code generator 211, pulse shaping filters 203 and 213, phase equalizers 205 and 215, interpolation filters 207 and 217, IF modulators 209 and 219 and a digital combiner 221.

Referring to FIG. 2, in the present invention, digital phase equalizers 205 and 215, digital IF modulators 209 and 219, and a digital combiner 221 are used instead of analog components having the same functions. Also, interpolation filters are added for adjusting sampling frequencies.

The pilot beacon signal is used for a hard handoff between base stations having a different frequency assignment (FA) in the CDMA radio communication system. The beacon signal generator should be designed based on parameters related to time delay and phase distortion occurred in signal transmission between the CDMA base station and the mobile station. Accordingly, in the present invention, interpolation of filter coefficient is important for performing the same operation as the conventional pilot beacon signal generator and generating a stable pilot beacon signal.

For digital intermediate frequency (IF) modulation, it is necessary to use at least four times the number of samples used for the pulse shaping filter and the phase equalizer. Accordingly, a pilot beacon signal generator of the present invention increases the number of samples by using the interpolation filter, increasing the number of samples after the phase equalizer.

The I-channel PN code generator 201 generates and outputs an I-channel PN code sequence. The pulse shaping filter 203 shapes an I-channel PN signal by filtering the PN code sequence from the I-channel PN code generator 201. In this embodiment, the pulse shaping filter 203 is implemented by a finite impulse response (FIR) filter, and coefficients of the FIR filter are modified regarding the interpolation filter 207. In detail, the pulse shaping filter 203 performs over-sampling at four times the chip rate and contains 48 tab coefficients each of which has 8 bit resolution. The tab coefficients of the pulse shaping filer 203 have values as follows:

Coef[0]=−0.0078125
Coef[1]=−0.0078125
Coef[2]=0
Coef[3]=0.0078125
Coef[4]=0.03125
Coef[5]=0.046875
Coef[6]=0.046875
Coef[7]=0.0390625
Coef[8]=0.0078125
Coef[9]=−0.015625
Coef[10]=−0.0390625
Coef[11]=−0.03125
Coef[12]=0
Coef[13]=0.0390625
Coef[14]=0.0546875
Coef[15]=0.0390625
Coef[16]=−0.0078125
Coef[17]=−0.0703125
Coef[18]=−0.1015625
Coef[19]=−0.0625
Coef[20]=0.046875
Coef[21]=0.203125
Coef[22]=0.3671875
Coef[23]=0.4609375
Coef[24]=0.4609375
Coef[25]=0.3671875
Coef[26]=0.2265625
Coef[27]=0.046875
Coef[28]=−0.0625
Coef[29]=−0.1015625
Coef[30]=−0.0703125
Coef[31]=−0.0078125
Coef[32]=0.0390625
Coef[33]=0.0546875
Coef[34]=0.0390625
Coef[35]=0
Coef[36]=−0.03125
Coef[37]=−0.0390625
Coef[38]=−0.015625
Coef[39]=0.0078125
Coef[40]=0.0390625
Coef[41]=0.046875
Coef[42]=0.046875
Coef[43]=0.03125
Coef[44]=0.0078125
Coef[45]=0

Coef[46]=−0.0078125
Coef[47]=−0.0078125

The phase equalizer 205 compensates phase of the I-channel PN signal from the pulse shaping filter 203. The digital phase equalizer compensates for phase distortion of the receiving filter in the mobile station. The phase distortion characteristics of the mobile station are obtained by a transfer function expressed by an equation 1.

$$H_{mo}(s) = \frac{s^2 + \delta_{mo}\omega_{mo}s + \omega_{mo}^2}{s^2 - \delta_{mo}\omega_{mo}s + \omega_{mo}^2} \quad \text{Eq. (1)}$$

where, a value of a damping factor is 1.36 ($\delta_{mo}$=1.36) a resonance frequency is expressed as: $\omega_{mo}$=2×π×315000. The transfer function of the phase equalizer is expressed as a following equation 2.

$$H_{pe}(s) = \frac{s^2 - \delta_{pe}\omega_{pe}s + \omega_{pe}^2}{s^2 + \delta_{pe}\omega_{pe}s + \omega_{pe}^2} \quad \text{Eq. (2)}$$

where, a value of a damping factor is 1.36 ($\delta_{pe}$=1.36), a resonance frequency is expressed as: ωpe=2×π×315000.

In this embodiment, the phase equalizer 205 is implemented by a secondary IIR filter. A bilinear transfer equation of the IIR filter is expressed by an equation (3).

$$s = \frac{2}{T_s} \frac{1 - z^{-1}}{1 + z^{-1}} \quad \text{Eq. (3)}$$

In the present invention, since the phase equalizer processes the signal by four times of chip rate, which is equal to output sampling frequency of the FIR filter, $$T_s = \frac{1}{1228800 \times 4}.$$

The transfer function of IIR Filter is expressed by an equation (4).

$$H(z) = \frac{C_3 + C_2 z^{-1} + z^{-2}}{1 + C_2 z^{-1} + C_3 z^{-2}} \quad \text{Eq. (4)}$$

where $C_2$=−1.45287892264133 and $C_3$=0.57918535386309.

In this embodiment, I and Q phase equalizers are implemented as one unit instead of separate hardware units. In the phase equalizer performs at 8 times the chip rate instead of four times the chip rate, and multiplexes the I signal and the Q signal.

The interpolation filter 207 performs up-sampling of the equalized signal to an intermediate frequency signal having sampling frequency for a primary IF modulation and removes harmonic component. In more detail, the interpolation filter 207 up-samples the shaped PN signal at a sampling frequency that is four times the chip rate to an intermediate frequency signal at a sampling frequency that is 16 times the chip rate. In this embodiment, the interpolation filter is implemented by a FIR filter having 12 tab coefficients of 8 bit resolution. The values the tab coefficient of the FIR filter are shown as:

Coef[0]=0.00781250
Coef[1]=0.04296875
Coef[2]=0.10546875
Coef[3]=0.19531250
Coef[4]=0.28906250
Coef[5]=0.34765625
Coef[6]=0.34765625
Coef[7]=0.28906250
Coef[8]=0.19531250
Coef[9]=0.10546875
Coef[10]=0.04296875
Coef[11]=0.00781250

The up-converter 400 converts the low frequency signal from the phase equalizer 205 to a high frequency signal.

The Q-channel PN code generator 211 generates and outputs a Q-channel PN code sequence. The pulse shaping filter 216 shapes the PN code sequence from the PN code generator 211. The phase equalizer 215 compensates the phase of the Q-channel PN code sequence from the pulse shaping filter 213. The interpolation filter 217 converts the low frequency signal from the phase equalizer 215 to an intermediate frequency (IF) Q-channel signal. The IF modulator 219 modulates the IF Q-channel signal and generates a modulated Q-channel signal.

The digital combiner 221 combines the modulated I-channel signal with the modulated Q-channel signal from the interpolation filters 207 and 217.

The analog signal processing unit 300 includes a D/A converter 301 and a band pass filter 303. The D/A converter 301 converts the combined signal to an analog signal. The band pass filter 303 filters out an undesired band from the analog signal and extracts a desired band of a beacon signal. The amplifier 400 amplifies the analog signal from the band pass filter 303. An amplified signal is radiated through the antenna.

The pilot beacon signal generator according to the present invention utilizes less analog components, which are complicated and sensitive to noise, and more digital component than the conventional beacon signal generator, thereby improving the integration density of the hardware and stabilizing the system. In other words, by using the digital phase equalizers, the digital up-converters and the digital combiner, multiple low pass filters are not necessary to be used in the present invention and the pilot beacon signal generator of the present invention is considerably smaller than that of the conventional pilot beacon signal generator. Furthermore, in the present invention, the digital signal processing unit 110, the analog signal processing unit 120 and the sector connection processing unit 130 can be integrated into one chip, i.e., a digital pilot beacon signal generating unit.

Further, the pilot beacon signal generator of the present invention generates and transmits only a pilot signal used for a beacon signal, to thereby reduce interference with other mobile stations. Accordingly, the pilot beacon signal generator stabilizes the communication system and increases the quality of the signal.

As mentioned above, using the pilot beacon signal generator of the present invention, the communication system can be more stable, compact and cost-effective, because the pilot beacon signal generator is less affected by noise and has a high integration density.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating pilot beacon signals for handoff between base stations having a different frequency assignment (FA) in a code division multiple access (CDMA) radio communication system, the apparatus comprising:
   PN code generating means for generating inphase(I)-channel and quadrature (Q)-channel pseudo noise (PN) sequences;
   pulse shaping means connected to the PN code generating means for shaping an I-channel PN signal and a Q-channel PN signal by filtering the I-channel and Q-channel PN sequences;
   equalizing means connected to the pulse shaping means for equalizing phases of the I-channel PN signal and the Q-channel PN signal and for generating an equalized I-channel signal and an equalized Q-channel signal;
   interpolation filtering means connected to the equalizing means for converting frequencies of the equalized I-channel signal with the equalized Q-channel signal to intermediate frequencies (IF) and generating an IF I-channel signal and an IF Q-channel signal;
   modulation means connected to the interpolation filtering means for modulating IF I-channel and Q-channel signals and for generating a modulated I-channel signal and a modulated Q-channel signal;
   combining means connected to the modulation means for combining the modulated I-channel signal with the modulated Q-channel signal and generating a digital pilot beacon signal;
   D/A conversion means connected to the combining means for converting the digital pilot beacon signal into an analog pilot beacon signal;
   filtering means connected to the D/A conversion means for filtering the analog pilot beacon signal, extracting a desired band of the analog pilot beacon signal and generating a filtered pilot beacon signal; and
   amplifying means connected to the filtering means for amplifying the filtered pilot beacon signal.

2. The apparatus as claimed in claim 1, wherein the pulse shaping means performs over-sampling at four time a chip rate.

3. The apparatus as claimed in claim 2, wherein the interpolation filtering means performs at 16 times the chip rate.

4. A method of generating pilot beacon signals for handoff between base stations having a different frequency assignment (FA) in a code division multiple access (CDMA) radio communication system, the method comprising the steps of:
   generating inphase(I)-channel and quadrature (Q)-channel pseudo noise (PN) sequences;
   shaping an I-channel PN signal and a Q-channel PN signal by filtering the I-channel and Q-channel PN sequences with a pulse shaping means;
   equalizing phases of the I-channel PN signal and the Q-channel PN signal and generating an equalized I-channel signal and an equalized Q-channel signal
   converting frequencies of the equalized I-channel signal with the equalized Q-channel signal to intermediate frequencies (IF) and generating an IF I-channel signal and an IF Q-channel signal;
   modulating IF I-channel and Q-channel signals and generating a modulated I-channel signal and a modulated Q-channel signal;
   combining the modulated I-channel signal with the modulated Q-channel signal and generating a digital pilot beacon signal;
   converting the digital pilot beacon signal into an analog pilot beacon signal;
   filtering the analog pilot beacon signal, extracting a desired band of the analog pilot beacon signal, and generating a filtered pilot beacon signal; and
   amplifying the filtered pilot beacon signal.

5. The method as recited in claim 4, wherein the step of shaping the I-channel PN signal and Q-channel PN signal comprises over-sampling at four times a chip rate.

6. The method as claimed in claim 5, wherein the step of converting frequencies of the equalized I-channel signal with the equalized Q-channel signal to intermediate frequencies (IF) and generating the IF I-channel signal and If Q-channel signal comprises sampling at 16 times the chip rate.

7. An apparatus for generating pilot beacon signals for handoff between base stations having a different frequency assignment (FA) in a code division multiple access (CDMA) radio communication system, the apparatus comprising:
   a PN code generating unit for generating inphase(I)-channel and quadrature (Q)-channel pseudo noise (PN) sequences;
   a pulse shaping unit connected to the PN code generating unit for shaping an I-channel PN signal and a Q-channel PN signal by filtering the I-channel and Q-channel PN sequences;
   an equalizing unit connected to the pulse shaping unit for equalizing phases of the I-channel PN signal and the Q-channel PN signal and for generating an equalized I-channel signal and an equalized Q-channel signal;
   an interpolation filtering unit connected to the equalizing unit for converting frequencies of the equalized I-channel signal with the equalized Q-channel signal to intermediate frequencies (IF) and generating an IF I-channel signal and an IF Q-channel signal;
   a modulation unit connected to the interpolation filtering unit for modulating IF I-channel and Q-channel signals and for generating a modulated I-channel signal and a modulated Q-channel signal;
   a combining unit connected to the modulation unit for combining the modulated I-channel signal with the modulated Q-channel signal and generating a digital pilot beacon signal; D/A conversion unit connected to the combining unit for converting the digital pilot beacon signal into an analog pilot beacon signal;
   a filtering unit connected to the D/A conversion unit for filtering the analog pilot beacon signal, extracting a desired band of the analog pilot beacon signal and generating a filtered pilot beacon signal; and
   an amplifying unit connected to the filtering unit for amplifying the filtered pilot beacon signal.

8. The apparatus as claimed in claim 7, wherein the pulse shaping unit performs over-sampling at four time a chip rate.

9. The apparatus as claimed in claim 7, wherein the interpolation filtering unit performs at 16 times the chip rate.

* * * * *